(12) United States Patent
Nikara et al.

(10) Patent No.: US 9,354,897 B2
(45) Date of Patent: May 31, 2016

(54) DYNAMIC CONFIGURATION OF AN APPARATUS BASED UPON POLICY AND COST FUNCTION CONSIDERATIONS

(75) Inventors: Jari Nikara, Lempaala (FI); Arto Palin, Viiala (FI)

(73) Assignee: Nokia Technologies Oy, Espoo (FI)

( * ) Notice: Subject to any disclaimer, the term of this patent is extended or adjusted under 35 U.S.C. 154(b) by 411 days.

(21) Appl. No.: 13/825,406

(22) PCT Filed: Sep. 22, 2010

(86) PCT No.: PCT/FI2010/050734
§ 371 (c)(1),
(2), (4) Date: Jun. 10, 2013

(87) PCT Pub. No.: WO2012/038580
PCT Pub. Date: Mar. 29, 2012

(65) Prior Publication Data
US 2013/0246778 A1    Sep. 19, 2013

(51) Int. Cl.
| | |
|---|---|
| *G06F 9/00* | (2006.01) |
| *G06F 9/44* | (2006.01) |
| *H04L 12/24* | (2006.01) |
| *H04L 29/08* | (2006.01) |
| *G06F 9/50* | (2006.01) |
| *H04W 4/02* | (2009.01) |
| *G06F 9/445* | (2006.01) |

(52) U.S. Cl.
CPC ............ *G06F 9/4411* (2013.01); *G06F 9/5061* (2013.01); *H04L 41/0816* (2013.01); *H04L 67/2804* (2013.01); *G06F 9/44505* (2013.01); *H04W 4/021* (2013.01); *Y02B 60/185* (2013.01)

(58) Field of Classification Search
CPC ... G06F 9/4411; G06F 9/44505; H04W 24/02
USPC .......................................... 713/100; 455/418
See application file for complete search history.

(56) References Cited

U.S. PATENT DOCUMENTS

| | | | |
|---|---|---|---|
| 8,750,824 B2* | 6/2014 | Kanamatareddy | 455/406 |
| 8,799,242 B2* | 8/2014 | Leonard et al. | 707/694 |
| 8,903,365 B2* | 12/2014 | Stricklen et al. | 455/418 |
| 2004/0111725 A1 | 6/2004 | Srinivasan et al. | |

(Continued)

FOREIGN PATENT DOCUMENTS

WO    WO-2009/013385 A1    1/2009

OTHER PUBLICATIONS

International Search Report for Application No. PCT/FI2010/050734; dated Jul. 1, 2011.

*Primary Examiner* — Chun Cao
(74) *Attorney, Agent, or Firm* — Alston & Bird LLP (57) ABSTRACT

The invention relates to a method for processing information in an apparatus having one or more interfaces to one or more peripheral components, said method comprising obtaining information about resources of the one or more peripheral components from at least one peripheral component, forming a policy basing at least partly on the information about the resources of the at least one peripheral component, forming a cost function basing at least partly on the information about the resources of the at least one peripheral component, determining an entry combination of the resources forming the cost function such that the entry combination is at least in part compliant with the policy and changing configuration of the apparatus to at least partly comply with the determined entry combination.

20 Claims, 6 Drawing Sheets

(56) References Cited

U.S. PATENT DOCUMENTS

| | | |
|---|---|---|
| 2005/0022185 A1 | 1/2005 | Romero |
| 2008/0005381 A1 | 1/2008 | Theocharous et al. |
| 2008/0201179 A1 | 8/2008 | Maes |
| 2009/0013380 A1 | 1/2009 | Chandrasiri et al. |
| 2009/0286543 A1 | 11/2009 | Nath et al. |

* cited by examiner

DYNAMIC CONFIGURATION OF AN APPARATUS BASED UPON POLICY AND COST FUNCTION CONSIDERATIONS

FIELD OF THE INVENTION

The present invention relates to an application infrastructure that scales dynamically to present environmental conditions in various abstraction levels.

BACKGROUND OF THE INVENTION

A traditional way of designing and implementing various data processing devices has been based on a centralized application engine. That is, a data processing device typically comprises a central processing unit (CPU), which may consist of one or more processors, and other parts and subunits of the computing system. The CPU then controls the operation of the whole computing system by delivering operation command to the subunits and by processing and transferring data to and from the subunits.

In general, software programs may consist of instruction sets executable by the CPU, which are arranged to receive input from the other units of the system for calculating an output of that instruction set. Further software blocks of instruction sets are transferred into a software modules which, in turn can be integrated together to form more complex software programs.

These sophisticated software programs may receive input in various forms for example as in raw data from mass storage hardware, as an user input from variety of user input devices, electronic information from different kinds of sensor devices, etc. In some instances, programs may be configured to produce data usable by other software applications. In these instances the chain of applications is not restricted, and various combinations of input/output relations can be produced. However, in these kind of setups problems may be presented when information is conveyed from one program to another. If the relationship is known before the software program code is created, then it is relatively easy to build up the system so that it uses one program's output as an input for another program. This kind of approach leads to rigid application relation architecture, where the functions of the software code and transactions between software entities are smooth, but the flexibility is lost and changes in functionality and architecture require each time remarkable revisions and effort.

However, more flexible modular software architectures for sharing information amongst programs have evolved recently. The modularity of a software architecture is used for breaking bindings between traditional software architecture blocks. Software modules can be removed, revised or modified without having to suspend the overall operation of the device. Software modules may contribute information to a shared memory space. Some other modules may be specialized to provide communication services. Altering program elements constructed according to this architecture may not affect program elements that are communicating with other program elements, nor jeopardize information stored in the system as long as shared memory space is available for other program elements in the system.

Software applications produced with modular elements can be used for example in situations where software applications are producing connectivity capabilities between two peer instances. The upper layer application using connectivity may require only reliable transport service for its data, while not setting expectations for the technique of conveying the data. In this situation modularity enables the change of used transport technology beneath if predefined event triggers the initiation of the change. This may mean for example switching the transport layer mechanism from a Universal Mobile Telecommunications System (UMTS) network to a Wireless Local Area Network (WLAN) connection if device comes to a range of a WLAN hotspot.

Current modular software architecture is restricted with very narrow application centric approach, where all architecture layers are designed for accomplishing specific service functionality from the top of the user inputs all way down to the physical layer implementation. Even though the transport mechanism can be changed currently beneath the application level, the procedure is static and tied to predefined resources and application instances initially configured to the system.

Hence there is a need for enhancing modularity and adaptivity of the software architecture in such a way that available resources for the software unit and communications between architectural modules can vary in time and the software program code will interact with its surroundings and resources in dynamical and adaptive way.

SUMMARY OF THE INVENTION

Now there has been invented a method and technical equipment implementing the method, by which the above problems are alleviated. Various aspects of the invention include a method, an apparatus, a server, a client and a computer readable medium comprising a computer program stored therein, for processing information in an apparatus having one or more interfaces to one or more peripheral components, said method comprising obtaining information about resources of the one or more peripheral components from at least one peripheral component, forming a policy basing at least partly on the information about the resources of the at least one peripheral component, forming a cost function basing at least partly on the information about the resources of the at least one peripheral component, determining an entry combination of the resources forming the cost function such that the entry combination is at least in part compliant with the policy and changing configuration of the apparatus to at least partly comply with the determined entry combination.

DESCRIPTION OF THE DRAWINGS

In the following, various embodiments of the invention will be described in more detail with reference to the appended drawings, in which.

DETAILED DESCRIPTION OF THE EMBODIMENTS

In the following, several embodiments of the invention will be described in the context of dynamic multilayer adaptivity. It is to be noted, however, that the invention is not limited to the examples and clarifications presented here. In fact, the different embodiments have applications widely in any environment where modular software architecture is used.

The need for multilevel dynamic application infrastructure arises when a software program product undergoes signifying alternation in the proximity environment that affects the current tasks it is performing. One example may be a change in a transport layer resource when user is watching streaming video in portable device, and there occurs reduction in available bandwidth due to movement of the user moving outside the range of high speed transportation provider like UMTS network.

With high level generalization it may be said that the invention reveals an application switch process, where the application is understood as a group of interoperable functionalities to produce the wanted end-user experience. The application may also consist of several such interoperable functionality groups and the switch process refers to exchange between the groups.

Figure 1A:
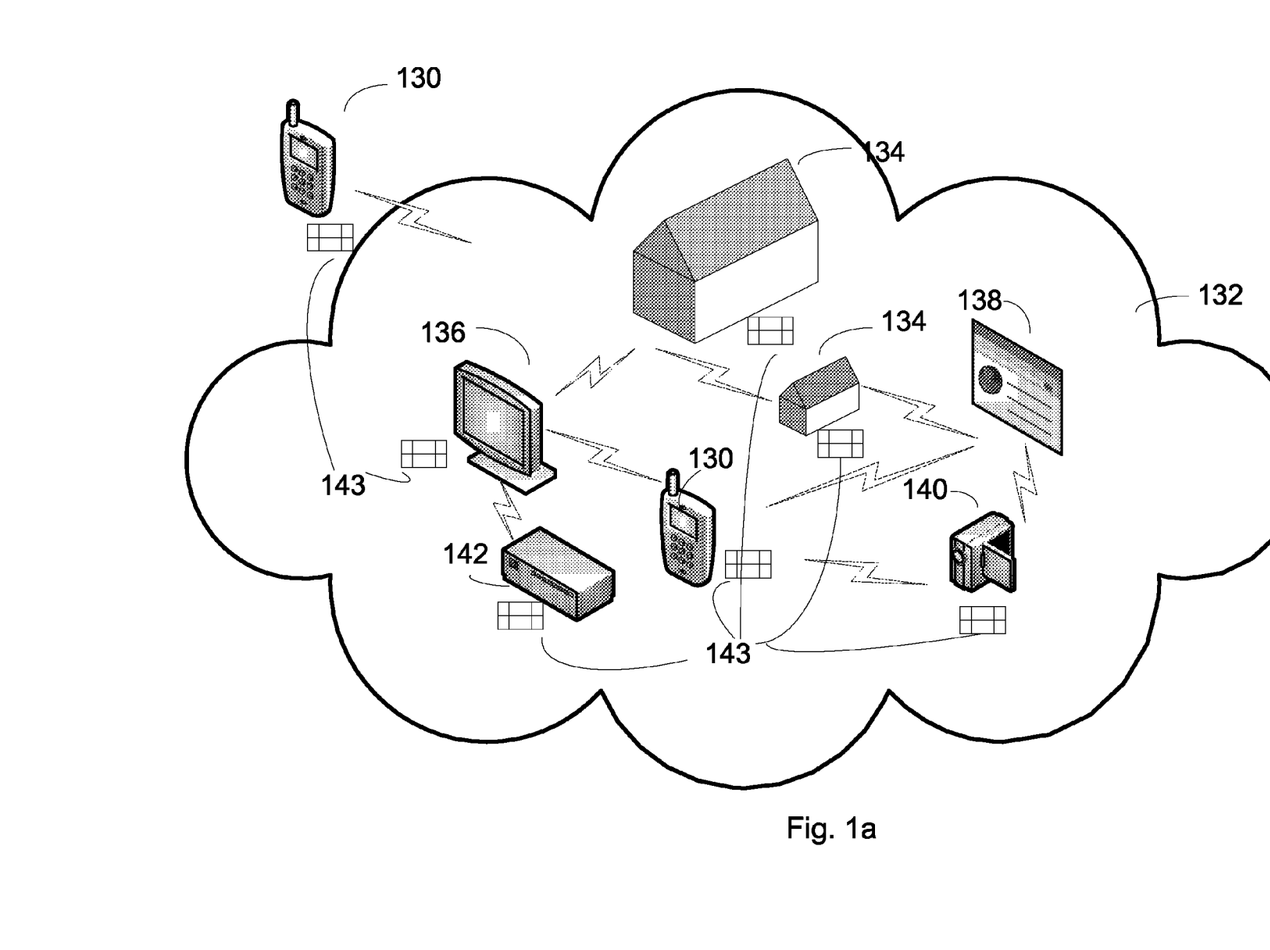
FIG. 1a shows an example of an environment in which the embodiments of the invention can be utilized.

FIG. 1a presents an architecture concept in which the embodiments of the invention can be utilized. A device 130, whose form is not restricted to any specific device type, but what is shown here only for illustrational purposes as a handheld device, can be used to interact with an entity cloud 132 of services and resources.

The device interaction can be of consuming kind of action, meaning that the device will utilize surrounding services and resources for carrying out tasks set by applications running in it. The device interaction may as well be offering kind, where the device 130 offers its resources to be used in the entity cloud 132.

The cloud could be, for example, an open network such as the Internet or some closed or semi-closed network like an intra- or extranet. The cloud could be constituted as well with higher abstraction level entities, for example with services 138 that are networked to each other and forming service clusters that are further interacting each other.

The embodiments of the architecture can be manifold what comes to the scale, and they can be implemented with devices, groups of devices, services, groups of services, subsystems, groups of subsystems, clusters etc. depending on the environment where embodiments are used. For simplifying terminology, all these devices, subsystems, clusters etc. now on are called peripheral components in the meaning that they are in relation with device 130 by both providing services and resources for use in device 130 as well as themselves capable of utilizing services and resources offered by the device 130. Device 130 and its peripheral components form here a network of resources with equally treated members.

Now considering the architecture from device 130 point of view, the peripheral components (devices, services, group of them, etc.) can belong to premises in a near vicinity of the device 130. The premises can be public or private, and they can be equipped with appliances e.g. consumer electronics devices like television/video display sets 136, video projectors 140, audio receivers/amplifiers 142 and similar. Each of the devices are equipped with data processing means like a microprocessor and memory, that comprises a data structure 143 stored in the memory for utilizing the architecture in later depicted way. The architecture may provide services 138 to be used together with appliances 130, 136, 140, 142 in optimal way.

The communication arrows in FIG. 1a are illustrative only and do not present any actual communication use case. However, from FIG. 1a it can be seen that architecture allows each resource in the area of interest to share their resources with other units' resources in equal manner. It is noteworthy that appliances, premise resources and services form together network of systems with equal actors so that depending on one's needs, the right resources can be identified and utilized in each resource consuming task.

The use of appliances is flexible, and they are used in the content consuming chain with the extent common policies and end-user indications allow. The set up of devices utilizing the resources offered by the architecture is selected basing on the information stored in the data structure 143, containing usually the knowledge of the available properties in each of the actors in the cloud 132. Each appliance that is implemented according to the architecture has its own data structure 143 for listing properties it can offer for the cloud 132. FIG. 1a presents that piece of peripheral components such as 130, 136, 140, 142 may work together as an infrastructure by utilizing the connection means the architecture offers.

The infrastructure is not restricted to physical devices, but as well as hardware the infrastructure may comprise service elements offered by the operating network 132, as well as environmental functions the physical environment of the hardware 134 offers. Physical environment 134 can comprise supply current, premise lighting, wired and wireless communication connections, air condition, etc. The rules given by users and the limitations the physical environment sets to the system are limiting the possible combinations to use resources of the cloud. The system, i.e. the cloud and all entities it contains, follows policies that are in their simplest form a set of methods that indicate how particular resources are selected from the cloud of resources and services.

Figure 1B:
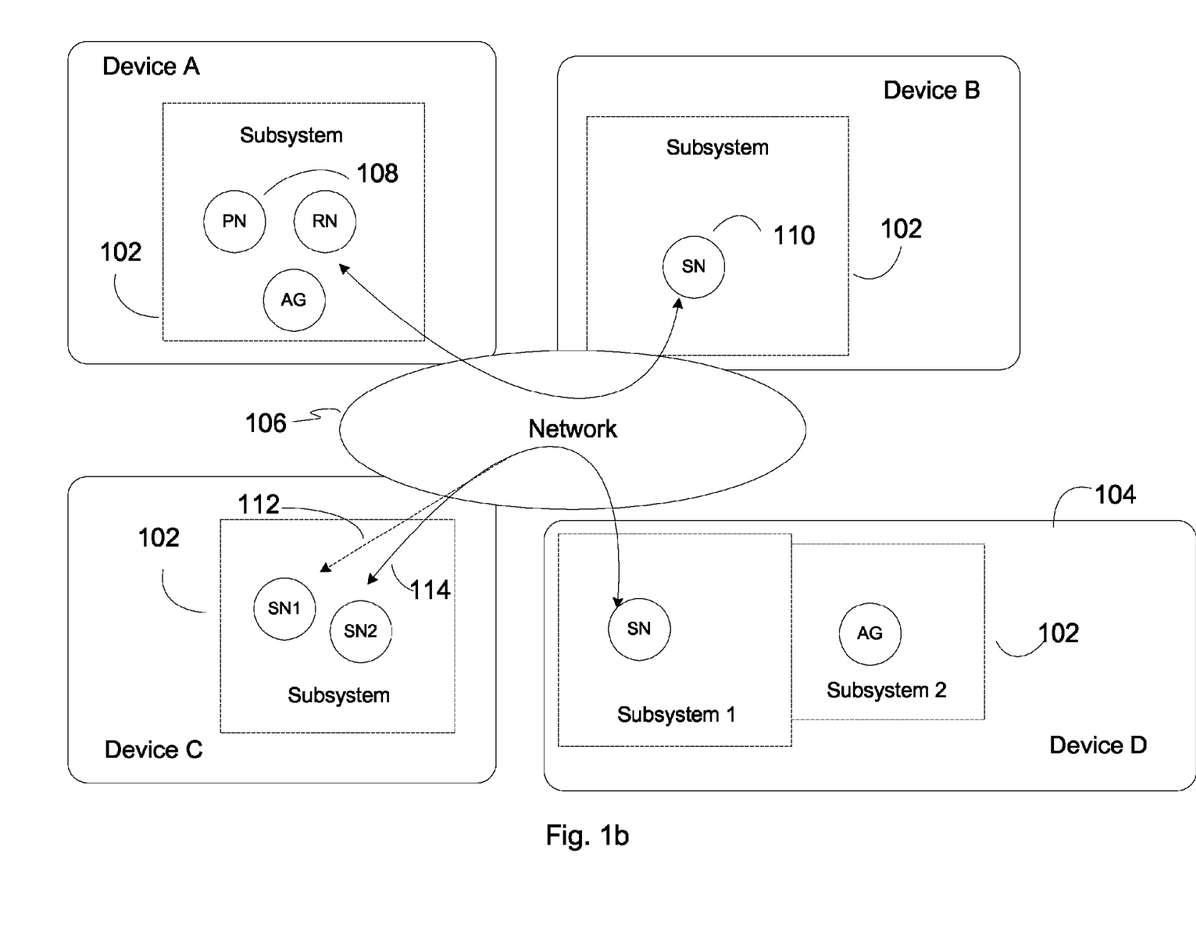
FIG. 1b shows another example of an environment in which the embodiments of the invention can be utilized.

FIG. 1b presents another possible software architecture concept that can be regarded as a viable, but not only, possible embodiment of an operating framework for the invention. It is basing on so called Network on Terminal Architecture (NoTA) that is a service based interconnect-centric platform architecture that is usable in various electronic apparatuses including wired and wireless devices.

The interconnect-centric approach currently is applied within single device having subsystems communicating directly with other subsystems within the device by supporting multiple parallel connections. NoTA has been providing only transport switch possibility within an application instance, and has not allowed scaling of the properties of application itself during changing conditions.

However, NoTA principles can be applied to cases which could be described as inter-device NoTA cases. In inter-device NoTA the architecture allows any physical sub-system like 102 residing for example in device A to directly communicate with other sub-systems residing in any other devices B, C and D via network 106 while supporting multiple parallel connections.

Direct connections are possible due to simple switches optimized for the underlying physical media. Inter-device NoTA interconnect architecture and related interfaces may be complexity and performance optimized for service and data communication, and may be designed in such a way that different communication media technologies can be utilized. As an example view of the inter-device NoTA architecture reveals, NoTA architecture consists of subsystems 102 residing in devices A, B, C, . . . connected together via network 106.

In case subsystems reside within the same device, the subsystems can also be coupled together directly, as shown at device D 104 in the FIG. 1b. A coupled scenario exists in cases where subsystems need to operate together on a frequent basis. Subsystems are not similar to each other, but may consist of varying number of service nodes (SN) 110 and application nodes (AN) 108. They may further have behavioral roles like proactive nodes (PN), reactive nodes (RN) and agent nodes (AG) depending on their needs to operate in a particular application.

As an example function of the architecture, a scenario is presented where device D is consuming resources from device C. Device D is connected to device C via network 106 by using for example a bearer with connection speed 150 kilobits per second. Service node in subsystem 1 in device D is in other words connected to service node 1 in device C with connection 112. Device D notices that connection 114 with better qualifications, like speed of 1 megabits per second, is available in device C. The change of transport bearer triggers the switching of service node from device D to use service node 2 instead of node 1 in subsystem of device C.

Service node 2 may comprise also other parameters different from ones the service node 1 provides. The rendering means for consuming content may change, for example so that the quality of consuming event will change drastically. However, this does not mean that there is a need to re-establish application instance that consumes the content with the new parameter set, but the existing application instance will adapt to new parameters fluently.

The dynamically scalable architecture infrastructure allows great variety of setups that carry out desired functions: The possible setups extend from basic scenarios of intelligent end user device consuming services from traditional network to cases where both the intelligence of the system and calculation capabilities reside in the network nodes and the end user device acts only as dummy terminal that is needed for interfacing and orchestrating the value content produced by the network.

It is possible that network service at hand utilizes web-techniques that need information from other cluster of services before the user can expect to experience results in his device. Such network services could require e.g. calculation and storage capabilities that would not be available in end user devices. The architecture at hand allows scaling, so that cluster of services can be regarded as one resource entity seen by other entities in the system. The actor of the system can be any entity in the architecture (i.e. not just the end user device), but only if it fulfills the architecture definitions. Because the resources of each entity in the architecture are available for every member of the system equally, the orchestrating member can reside somewhere in the cloud and user device acts only as a dummy resource source for the rest of the system.

In one embodiment services are managing architecture environment's device pool in such a way that resources of devices are fulfilling the needs of services. The service needs may be aroused by new telecommunication operator services, by third party service provider products, by end user device manufacturers and similar.

This approach brings more control to cluster owners over the end user device owners, and will among the other things give new revenue models to service concept owners. The clusters may include web shop elements, end user device management functions like software update controls, web shop content creating and control tools and similar. Depending on the degree of control that is given in the architecture to a peer member in the realm the function of the peer can vary from thin to thick client. Architecture does not determine the intelligence of the peer member anyhow, but it is an implementation issue that needs to be decide case by case each time.

In one embodiment user may have downloaded a video file from network and is watching it from a handheld video rendering device. Video clip may be coded with H.264/AVC, MPEG-4, H.261, RealVideo, Xvid, OpenAVS or any other video codec, the handheld device being able to decode the video clip and offer the audiovisual content to the user. The video may be downloaded from a network server as a complete package to the device, or it can be downloaded and consumed as on-demand basis using streaming techniques offered by the network.

The equipment the user is using could have for example MPEG-4 codec and a display resolution of 240×320 pixels. The device could also support for example stereo sound. The user has started to watch the video outside of the premises, while sitting on a bench in a nearby park, for example. Suddenly user remembers he has forgot to feed his cat, Fenix. Since Fenix is very precise her feeding times, user decides it would be better to return his premises and feed the cat before it decides to do anything demonstrational. However, the film he is watching is very attractive, and he continues watching it while pacing back to home. User opens the front door of the apartment and enters the kitchen. By peeking once a while the screen of the handheld device user feeds Fenix the cat. Then user moves to living room of the house since he wants to see the rest of the video in bigger screen. His television supports high definition television (HDTV) standard, and has in-built intelligence in such a way that it can present electrical program guides and run small sub-routine programs. In other words the television device has some computing power and inbuilt memory. User has also a consumer audio equipment, which can decode different kinds of stereo and surround sounds from variety of audio coding formats. As examples these formats comprise Red Book compact disc standard, WAV, AIFF, MP3, Vorbis, WMA, MP4, FLAC, etc. Decoder device has also simple microprocessor and memory block inbuilt, and it is possible for the consumer audio device to perform simple program codes that are installed to its memory block.

What user perceives next is the video he was watching with the portable device is bound to his living room appliances, and the portable device prompts whether the user wishes to continue consuming the video content with resources offered by the living room. If the user accepts the transfer, he continues seeing the video without any interrupts except the prompted transfer dialog, whereas the properties of the content have been scaled to the living room resources: The video resolution has changed to support HDTV capable display device and the sound coding changed to support several surrounding speakers and separate subwoofer. What has happened is a dynamic multilayered adaptation to new resources offered by changed user environment.

Figure 2:
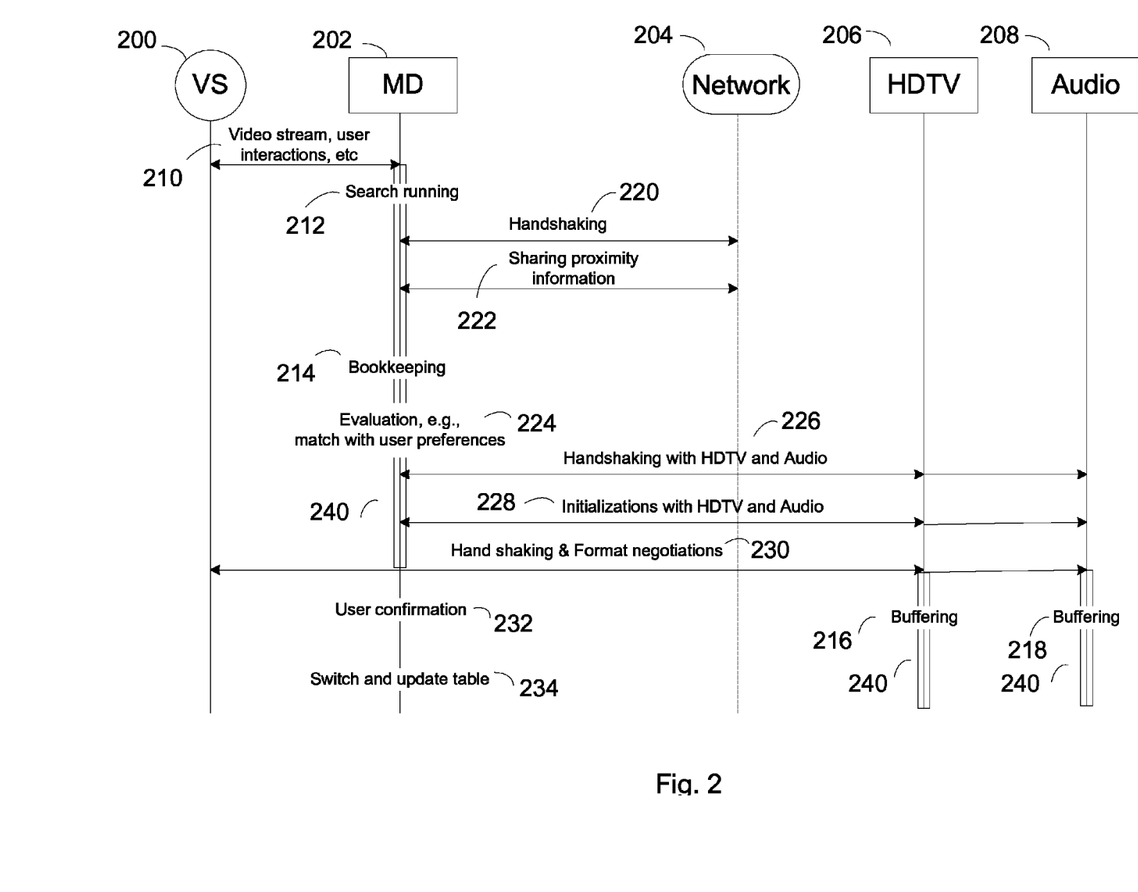
FIG. 2 shows one embodiment of the invention in a flow chart format.

As an embodiment FIG. 2 shows in a sequence chart format a more detailed picture what actual happened in the previous example: Involved in the actions there are present first of all an on-demand video service (VS) 200, which could also be some other network service, depending on the circumstances. End-user's mobile device (MD) 202 represents physical device, as well as home appliances like HDTV 206 and home theater receiver/amplifier 208. Moreover, the HDTV could be any display unit that is equipped with capabilities of storing and presenting information relating its internal status and functional modes. It is also assumed that audio device has enough intelligence for storing and presenting simple status information. In the room there is also present a network 204, which could be hosted at any device with any networking technique. This means the network could be for example a near field network, Bluetooth proximity network, WLAN or similar. Video service 200 establishes a transport channel 210 with the mobile device 202. The transport channel may contain streamed video content, user interaction related data etc. The channel may be established with any communication mechanism that suits for the aroused needs. The video player application used in mobile device 202 is installed only locally to the device 202, and it is not tied to any specific network service or content provider. Hence the player can be used wherever user is moving.

While streamed content is consumed, for example, the sub-routines of the mobile device 202 perform search functions, which monitor the surroundings of the device and mark up to a book keeping table which transport mechanisms are in use and which transport mechanisms could be used, what is the load of the processor at that moment, what data formats are supported, what data formats are available from other proximity devices, what kind of interfaces are active, etc. In short, the device is aware of its surroundings by itself or based on shared information, regarding its current configuration. Similar manner sub-routines of other actors like HDTV 206, audio 208 and even service 200 in the functional environment keep track of their internal state and surroundings by recognizing meaningful changes there. They also update their book keeping tables accordingly and are ready to provide or consume resources and services when resource economy so dictates.

The mobile device 202 connects to the network 204 by using one set of possible multiple connection parameter sets found in the search phase 212. The selected transport mechanism may require exchanging of initial messages before the actual data transmission can take place, and a procedure called handshaking 220 between mobile device 202 and the network 204 may be required. In the handshaking phase the mobile device 202 and the network 204 negotiate the connection parameters within the selected communication method. These parameters may include, but are not limited to, an information transfer rate, coding alphabet, parity, interrupt procedure and other protocol and hardware features. The hardware features may include further the information of the capabilities within the space the networked appliances form. The book keeping table of the connecting mobile device 202 is shared 222 in the sharing phase with the entire network 204. Same time the mobile device 202 becomes aware of the capabilities of the already networked devices by receiving the information of present capabilities announced in the tables of the networked devices. The mobile device 202 updates in 214 its book keeping table for complying with the capabilities of its present surroundings, and takes actively these new parameters into account when calculating most advantageous optimization alternatives for performing its functions.

The capabilities of the entire network is revealed in the search and handshaking process for the connecting mobile device and on the other hand the network 204 also learns the capabilities and services the mobile device 202 provides. The result of this is that the mobile device 202 can be offered by the network to proceed its current operational state with resources borrowed from other networked entities with more favorable user experience or more effective data processing capabilities. Also the negotiations may open up totally new ways to use the device. The recognition of the device 202 may enable the automatic downloading of the optimal parameter settings for the devices forming the proximity environment of the device. The suitable drivers for the proximity connected devices may be downloaded from the data servers of the manufacturers of the networked home appliances for best user experience in that space. The parameter sets may also be made available in an internet service, where users may themselves rate parameter sets for their applicability to certain setups. The automatic downloading may recognize user's preferences and choose for downloading the best rated setup fulfilling the user's needs.

The downloading of setup information from network is only one option in the variety of functionalities the proximity network offers. The proximity network itself may consist of several possibilities to carry out actions and services the mobile device 202 is performing or is going to perform in near future. The book keeping mechanism 214 provides also means for evaluating at 224 the sets of parameters and to select the most favorable set in the light of user defined preferences.

When the mobile device 202 is aware of its surroundings, it can select from the book keeping table one of the parameter sets corresponding best to its needs. After the evaluation of the available resources 224 the mobile device 202 knows it has a HDTV capable display device 206 in its vicinity as well as a home theater receiver/amplifier 208 for presenting sound information because these appliances have also made their capabilities available by publishing their information via book keeping table's of their own. The mobile device 202 starts hand shakings 226 with the display device 206 and the home theater receiver/amplifier 208 for finding out the supported content coding methods and communication protocols. It is not required, nor needed for the mobile device to know all details of the forthcoming stream used by joining components. The exchange of information in handshaking 226 is based on hierarchical book keeping; information that is relevant to each member of the system is exchanged respectively between these members of the system so that the change in the control of the service can happen smoothly. The exchanged information may offer a control point of the service and system functionality to the end user device, it may offer the control point to another device in the system, or the exchanged information may otherwise help the involved devices to adjust themselves to the operation of the rest of the system.

When the mobile device 202 has found and negotiated the connection parameters that can be used for continuing the ongoing consumption of the content, the display device 206 and the home theater receiver/amplifier 208 are both readied in 228 to take care of the responsibility of showing the content of the streamed video. In book keeping table level the book keeping table of the mobile device 202 indicates that the functionality for showing video content to the user has recently got one alternative parameter set with HDTV quality video and full surround sound.

Mobile device 202 bypasses a source information for example with a smart pointer or a handle to the display device 206 and the home theater receiver/amplifier 208. The devices find the right content from the source content provider by using the handle, and may start exchanging further information of variables, formats, operations and functionalities between content provider and themselves in 230.

The user valued preferences indicate that the properties of bigger screen and surround sound are highly valued by the user, and hence the use of the newly found parameter set would be a very good candidate to change with. When details of newly formed consuming chain from the source content provider, the video service 200, to the display device 206 and the home theater receiver/amplifier 208 devices are exchanged, the user may next be asked whether the change of content presenting means to newly found set is acceptable for example by prompting a dialog box to the user interface level in 232.

When the switch confirmation is retrieved from the user, the responsibility to show video stream content from the video service 200 is transferred in step 234 to the display device 206 and the home theater receiver/amplifier 208. At the same time the book keeping tables are updated in each device accordingly to comply with the new situation. The responsibility to present the content is shown with bars 240 in the FIG. 2, where the mobile device is first involved to the chain but later on dropped from the chain when streamed video goes directly from video service to new presenting devices 206 and 208. In 216 and 218 the display device 206 and the home theater receiver/amplifier 208 may receive content from the video service 200 beforehand, so that content can be buffered to these devices for ensuring the quality of the user experience.

After the application switch 234 the mobile device 202 is dropped from the middle and the mobile device 202 updates its book keeping table to correspond to the new situation. The mobile device 202 may continue to be in a backup mode, and later it is also possible to switch the presentation responsibility back to the mobile device 202 (action not shown in the figure) by using similar kind of handle that was used earlier for expanding presentation to more powerful devices. A situation may arise where the user needs to leave premises and still wants to continue the consuming of the content.

It is also possible to switch the presentation back to the mobile device 202 by detecting the changing factors in states of the conditions in reach of the system. In this case for example while using home appliances for entertainment, user may switch on the video service application in his hand held device and wish to continue consumption of the video content in it while he leaves the room where appliances reside.

Detection of changed factors in both service and space around the system will cause re-calculations of the cost functions in the environment around involved entities, and if better suiting parameter set for consuming video service on the fly is available resources will be utilized in newly manner.

Figure 3:
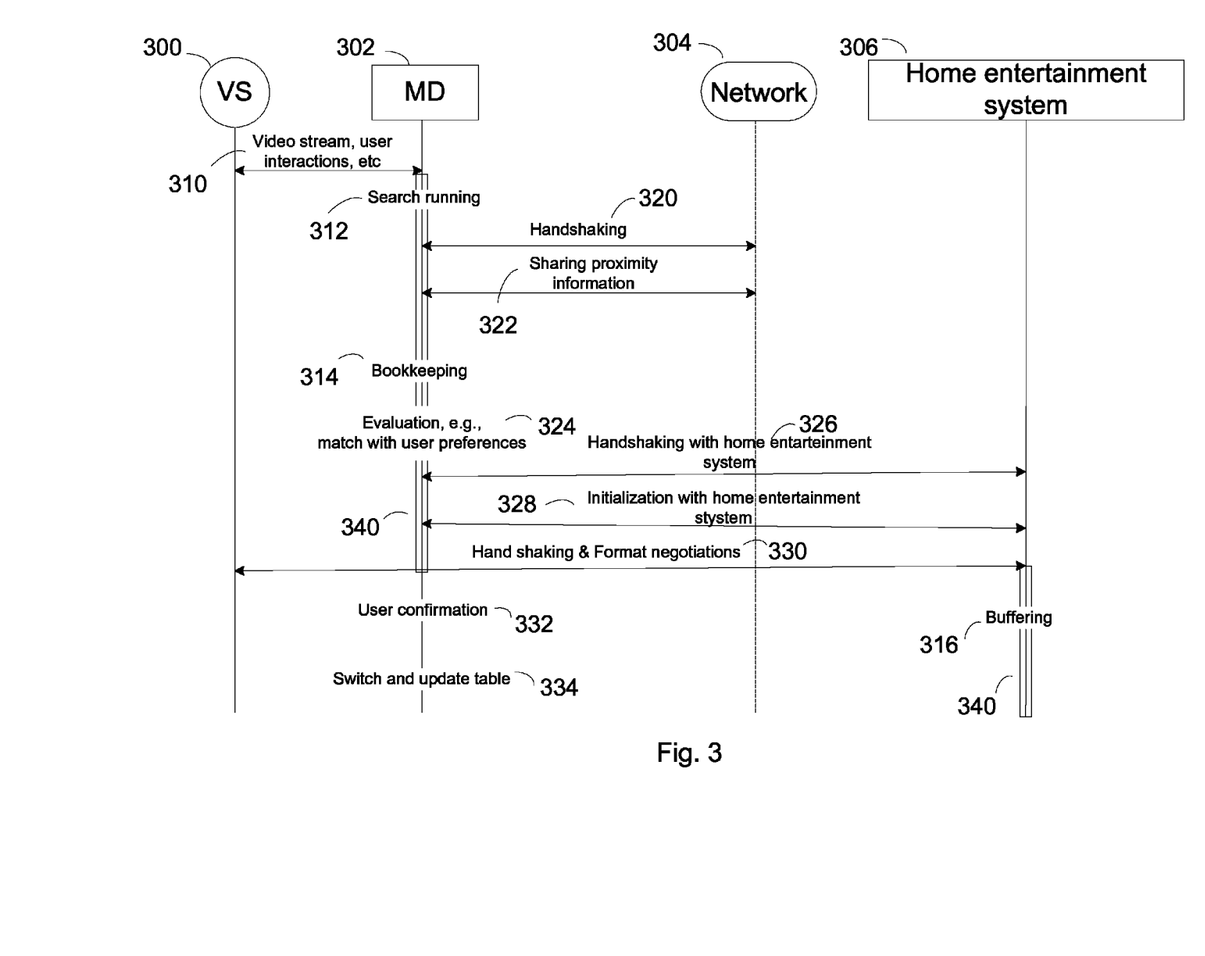
FIG. 3 shows another embodiment of the invention in a flow chart format.

In another embodiment, in FIG. 3 is presented a sequence chart in case where a home entertainment system 306 is receiving the responsibility of showing streamed video content 310 instead of the mobile device 302. The home entertainment system may be for example an integrated media server, that can be used to control all home entertainment devices together, a game console with extended entertainment capabilities such as a media/disc player capability, various wired/wireless interfaces, an Internet connection, etc., or some other device with similar capabilities. A video service (VS) 300 is used as an example provider of the consumed content.

It is assumed that the home entertainment system 306 has enough intelligence for storing and presenting simple status information. In the space there is also present a network 304, which could be hosted at any device with any networking technique. When the content is consumed in the mobile device 302, video service 300 establishes a transport channel 310 with the mobile device 302. The transport channel may contain streamed video content, user interaction related data etc. The channel may be established with any communication mechanism that suits for the aroused needs. The video player application used in mobile device 302 is installed only locally to the device 302, and it is not tied to any specific network service or content provider. Hence the player can be used wherever user is moving.

While streamed content is consumed, for example, the sub-routines of the mobile device 302 perform search functions 312, which monitor the surroundings of the device and mark up to a book keeping table which transport mechanisms are in use and which transport mechanisms could be used, what is the load of the processor at that moment, what data formats are supported, what data formats are available from other proximity devices, what kind of interfaces are active, etc. In a similar manner sub-routines of the home entertainment system 306 and service 300 in the functional environment keep track of their internal state and surroundings by recognizing meaningful changes there. They also update their book keeping tables accordingly and are ready to provide or consume resources and services when resource economy so dictates.

The mobile device 302 connects to the network 304 by using one set of possible multiple connection parameter sets found in the search phase 312. The selected transport mechanism may require exchanging of initial messages before the actual data transmission can take place, and a procedure called handshaking 320 between mobile device 302 and the network 304 may be required. In the handshaking phase the mobile device 302 and the network 304 negotiate the connection parameters in a similar manner as in previous embodiments.

The book keeping table of the connecting mobile device 302 is shared in the sharing phase 322 with the entire network 304. At the same time the mobile device 302 becomes aware of the capabilities of the already networked devices by receiving the information of present capabilities announced in the tables of the networked devices. The mobile device 302 updates in 314 its book keeping table for complying with the capabilities of its present surroundings, and takes actively these new parameters into account when calculating most advantageous optimization alternatives for performing its functions.

In this embodiment, the capabilities of the entire network is revealed in the search and handshaking process for the connecting mobile device 302 and on the other hand the network 304 also learns the capabilities and services the mobile device 302 provides. The result of this is that the mobile device 302 can be offered by the network to proceed its current operational state with resources borrowed from other networked entities with more favorable user experience or more effective data processing capabilities. Also the negotiations may open up totally new ways to use the device. The recognition of the device 302 may enable the automatic downloading of the optimal parameter settings for the devices forming the proximity environment of the device. The suitable drivers for the proximity connected devices may be downloaded from the data servers of the manufacturers of the networked home appliances for best user experience in that space. The parameter sets may also be made available in an internet service, where users may themselves rate parameter sets for their applicability to certain setups. The automatic downloading may recognize user's preferences and choose for downloading the best rated setup fulfilling the user's needs.

The downloading of setup information from network is only one option in the variety of functionalities the proximity network offers. The proximity network itself may consist of several possibilities to carry out actions and services the mobile device 302 is performing or is going to perform in near future. The book keeping mechanism 314 provides also means for evaluating at 324 the sets of parameters and to select the most favorable set in the light of user defined preferences.

When the mobile device 302 is aware of its surroundings, it can select from the book keeping table one of the parameter sets corresponding best to its needs. After the evaluation of the available resources 324 the mobile device 302 knows it has a home entertainment system 306 in its vicinity since this appliance has also made its capabilities available by publishing the information via a book keeping table of its own. The mobile device 302 starts hand shaking 326 with the home entertainment system 306 for finding out the supported content coding methods and communication protocols.

When the mobile device 302 has found and negotiated the connection parameters that can be used for continuing the ongoing consumption of the content, the home entertainment system 306 (or game console etc.) is readied in 328 to take care of the responsibility of showing the content of the streamed video.

Mobile device 302 bypasses a source information for example with a smart pointer or a handle to the home entertainment system 306. The home entertainment system 306 finds the right content from the source content provider by using the handle, and may start exchanging further information of variables, formats, operations and functionalities from content provider in 330.

The user valued preferences indicate that the properties of bigger screen and surround sound are highly valued by the user, and hence the use of the newly found parameter set would be a very good candidate to change with. When details of newly formed consuming chain from the source content provider 300 to the home entertainment system 306 is exchanged, the user may next be asked whether the change of content presenting means to newly found set is acceptable for example by prompting a dialog box to the user interface level in 332.

When the switch confirmation is retrieved from the user, the responsibility to show video stream content from the video service 300 is transferred in step 334 to the home entertainment system 306. Same time the book keeping tables are updated in both devices accordingly to comply with the new situation. The responsibility to present the content is shown with bars 340 in the FIG. 3, where the mobile device is first involved to the chain but later on dropped from the chain when streamed video goes directly from video service to new presenting device 306. In 316 the home entertainment system 306 may receive content from the video service 300 beforehand, so that content can be buffered for ensuring the quality of the user experience.

After the application switch 334 the mobile device 302 is dropped from the middle and the mobile device 302 updates its book keeping table to correspond to the new situation. The mobile device 302 may continue to be in a backup mode, and later it is also possible to switch the presentation responsibility back to the mobile device 302 by using similar kind of handle that was used earlier for expanding presentation to more powerful devices.

Figure 4:
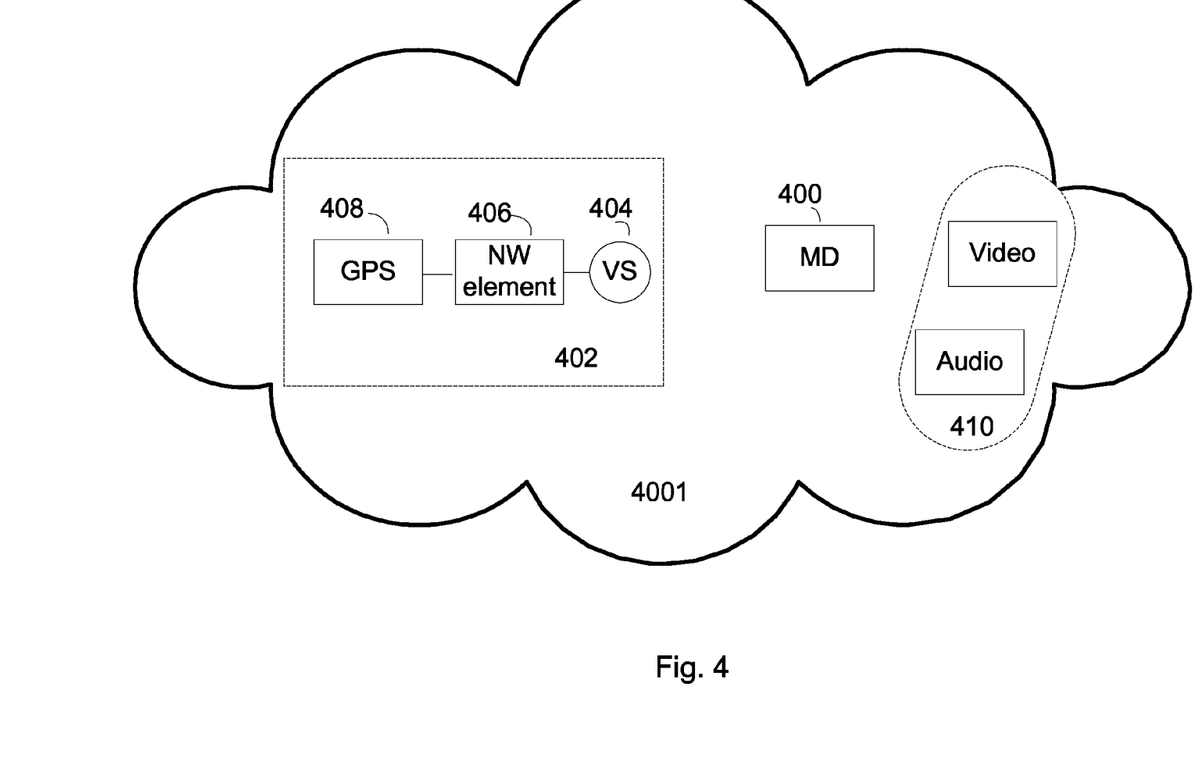
FIG. 4 shows an example of an environment in which the embodiments of the invention can be utilized.

For better understanding the possibilities the resource based optimization offers, yet another embodiment is presented in FIG. 4, where the control of delivering content to a mobile device 400 may reside on the content providing service side 402. All elements are networked to each other with some networking technology 4001 such as satellite, cellular, wireless local area networks, infrared communications etc. A network element that provides the consumed video content (Video service 404) may be connected to another network element 406 that keeps track on the movements of mobile device 400. The network elements together decide what content format is best suited to environment where mobile device 400 resides at each moment. If network elements recognize the connection capabilities within proximity of mobile device 400 seem to change so that better speed for retrieval is achieved, the mobile device 400 may be forced to change the transport mechanism to one that enables better speed.

As well if content providing server 404 deduces by help of GPS tracking server 408 or some other location resolving service that in vicinity of mobile device 400 there are also video rendering and playing appliances 410 that can provide significant improvement to user experience, the network server 406 may alter the parameters of source stream, and force the video content presentation played in the mobile device 400 to switch to use the more powerful devices.

The user may be prompted whether he found the change desirable, but the mobile device 400 need not to do computations or other efforts to discover new presentation possibilities, since those are already done and now only offered to the mobile device 400 by the content providing service 402.

The enabling technology beneath the described functionality is a specific modular software architecture infrastructure that allows a creation of a mechanism to observe surroundings and entities of the actors in the system by aid of sensors, messages conveyed via internal interfaces, user input appliances and similar. The quantities derived from these impulses are monitored and stored and used in the infrastructure for decision making purposes. The infrastructure is capable for producing in companion with the user a policy model and a budget that indicates what are the limits of the actions the policy allows. The actor of the system reacts to information the policy control announces to it, and changes its behavior accordingly.

The budget is drawn up usually by help of the user, but several quantities may be monitored internally with routines of the entities of the system themselves and appropriate interpretations of readings in light of determined budget policy can be done user-independently.

This may result to changes in system's functionality and perceived user experience. User may want to emphasize one measured quantity over others, and in that case budget is drawn up based on that quantity.

Same time hidden user-independent adjustments may be performed based on that information. There may be for example a need to maximize the time the battery can produce energy to the system or maximize the time the device can orchestrate the functionality of the system in cases where the system consists of elements that are not all in the same device.

User may have indicated his willingness to reduce some functionalities of the device in which the system is running. It is possible that if the user is watching a streaming video, system reduces the decoding power at some point by changing from using HDTV video codec to a MPEG 4 video codec. The display brightness may also be affected, as well as some lower valued network services that might be used at the same time. For example, the connection to a mailbox might be disconnected if user's primary usage with the current usage policy is set to video watching with as long lasting battery life as possible.

The system reads information from its surroundings via interfaces to a data structure referred as a table. Information collecting procedure is like book keeping; the system is aware of interfaces it has, and can recognize and analyze data transferred through them. The scalability of the system is noteworthy here; the system interfaces can be like interfaces between server clusters like location resolving network cluster and end-user internet application providing service. The system can be of any size, e.g. a small scale arrangement of hand held device and its surrounding resources. As its smallest, the system can be a single appliance consisting of software subsystems.

For a system consisting of an appliance and peripheral components, there may be for example interfaces for a user input device like a keyboard, touch display, or similar for a user to enter information to the device, the interface may receive data from a temperature sensor, a haptic sensor, a position sensor, accelerator sensor, optical sensor, optochemical sensor, radio antenna etc. The interfaces may be very diverse and the collected information may be anything that can be detected with technological means. The mechanism how information from the interfaces is collected may vary. The device may handle mapping of the information to the adaptive resource table internally.

There may also be for example a specific service element in the system that collects the information. The element needs not to be in the same physical device as the information collecting interfaces are located. Based on the detected information, the service element can evaluate the resources lying behind the data. One possibility is that the service element provides means for guiding the usage of the identified resources in the system. It is possible that the user device that is used primarily for desired action is not capable of utilizing surrounding resources by itself in full potential due to for example some scaling issues. On the other hand, the service element may have capable powers or it may be connected further to elements capable of controlling and coordinating found resources.

Since interfaces, and peripheral components with resources behind them, are monitored continuously, system knows on each point of time what resources it can use. System collects information of these resources to the data structure of a table. The filling of the resource table is not restricted only to observations of physical quantities. They can also be other features and properties concerning the system. System may mark up to the table a capacity information of the system and different alternatives of using combined properties of the present features. From at least these pieces of information the system deduces so called cost function information relating to different alternatives the system has. Some combinations of these pieces are more expensive for the entirety than others. Cost functions may be constructed in many different ways; they may be mathematical functions, conditional functions, they may be constructed with adaptive resource tables etc. However, cost functions have always some dependency with properties of the system and they measure the tradeoff between gain and the corresponding cost of system's functionality.

In simplest form the system may have a resource table presenting its communication and processing capabilities from different transportational and operational points of views: Table may have entries indicating for example that the system connects to its proximity space with Bluetooth connection with speed of 3 megabits per second, it also has 802.11 WLAN connection with current speed of 32 megabits per second, latency of 200 ms and throughput reliability 96%, it has MPEG-4 codec, its processor's temperature is 53 degrees Celsius, its battery is 73% full, and it is capable of producing virtual surround sound. The system sums up different entry combinations and forms for each connection type cost functions with entry combinations separately and places them to the table as well.

Cost functions are real time functions and their parameters change same time as the system's state changes. For performing a characteristic task for a device, e.g. providing a data connection to a remote server, the system may have several combinations and configurations of the parameters in the table at the same time which all lead to desired functional outcome, the only difference being the used set of the properties. The system's processing capabilities are evaluated and processing may be scaled and transferred within the components of the system so that the best utilization of this information is achieved. This may result for example in transferring some high load video encoding computation to a network instead of processing data locally in the user device. The transfer of data to the calculation entities is continuous, meaning that selection of the processing place is done one by one for each cost functions. This way processing can be distributed between network resource and local user device in very flexible way. Possibilities vary from true thin client to full rich client, depending on the cost functions selected to produce the desired action. The mechanism behind the selection of best utilization setup is an optimization process. System's active cost functions are monitored continuously and the local minimum is calculated from each function. Whenever a cost function's local minimum is achieved system checks if found optimized setup provides better outcome with the desired parameters than the currently used cost function. If found minimum cost overcomes current function selection, the system changes its state so that most favorable setup can be switched on. Sometimes the change requires user confirmation, but in many cases system can change its functional working pattern without surfacing the decision making to the user level. Finding of local minimum cost can be in its simplest form only a filtering over the resource table with right filter or performing some other matching against user preferences or sensor data. However, in some cases finding local minimum does not yield the best results to system's point of view. In those cases some other mechanisms for finding optimal resources should be used.

For providing accurate and real time optimization results, it is important to maintain book keeping information up to date. Also there needs to be agreed a policy that comprises conditions and rules which trigger the system to turn to use a certain cost function. Policy is monitoring the set of properties from the table. The policy is drawn up from user-initiated wishes of how the system is expected to behave in different situations. The policy also needs a budget that sets a frame to which environmental and system's internal conditions and resources set boundaries.

One embodiment may occur in a system that can decode high compressed video data and provide it for viewing via some display unit. The book keeping table may indicate that MPEG4 codec is available and system's processing unit's internal temperature is e.g. 56 Celsius degrees. The budget for such a system may indicate that the highest allowed temperature is 70 Celsius degrees. Now the user may want to charge the battery same time he watches the video file. The policy monitors the temperature of the processing unit, as well as the limits budget sets to the highest allowed temperature. When charger is connected, policy notices that the charging rises the temperature of the processing unit, till it reaches the budget's highest allowed value. Depending on the policy settings user may have set for the system, the system may abort the charging and play the video as long as there is any energy left in the battery, or the system may continue charging process but at the same time reduces the processor load by switching to a lighter coding scheme. Each of these possibilities has its own cost functions, and the action the system finally selects to perform depends on the preferences the policy knows, inherently given by a user or by monitoring the former favor of available cost functions.

One embodiment is drawn from the situation where a device has book keeping table indicating that the device is currently connected to high speed data network like wired Ethernet with physical connection, WLAN, WCDMA or any connection which can fulfill requirements set by TCP/IP networking scheme. The book keeping table also indicates that the device has capabilities for providing video calls to a user. The video call application, such as Skype or similar, is using first the full potential of the network capabilities and providing high definition image and high quality voice to the user. It is possible that the user moves during the call to place where TCP/IP capable connections are not available anymore, but a Bluetooth connection to a nearby computer is available and hence connection to Internet is still possible. The cost functions in the book keeping table now give several possibilities for the application to react. One cost function in the table may indicate that system has fast Ethernet connection and bandwidth-demanding video and voice compression algorithms in use, the current battery drain is 30 milliamperes and that current will dry out the battery capacity within next hour.

Another cost function may indicate that newly reached Bluetooth connection is providing a connection with speed of 3 Mbytes and another less power-demanding voice codec is available. System has also built-in priority list as part of policies which contains basic prioritization rules indicating which functions of the device are essential and which ones can be sacrificed for maintaining functions higher in the priority. For example maintaining rich communication enabler blocks may override the use of entertainment audio player blocks, and maintaining basic communication connection block, like GSM radio interface, overrides rich communication connection functions, like video call enablers. In this embodiment it is possible that the system is first connected to WCDMA network with radio interface. The system monitors the connection quality availability and notices that it is not possible to maintain high speed video call via video call application anymore because the bearer signal is weakening continuously. This way the cost function for still using the WCDMA bearer is becoming unfavorable. The cost function containing Bluetooth bearer is providing affordable connection, but capabilities for providing video call functionality would be vanished together with WCDMA connection. Book keeping table contains information of the throughput capacity of the Bluetooth connection.

On the other hand the book keeping table contains information how much resources are required by other alternative communication means within the video call application and what alternative choices there are for resource allocation. Such choices comprising for example a change to another video stream codec having better packing ratio but heavier computational requirements, a capability of load balancing between terminal and server device for adjusting the location where calculations are performed, reallocation of tasks for ensuring release of capabilities for key processes, UI optimization e.g. by altering the size of the application window according to the load of the computation resources, switching to plain voice communication, using only real time instant messaging extension, switching to SMS messaging, etc.

It is possible that the system in the absence of chance to continue with the video call calculates a new optimum for maintaining communication capability between call participants, and ends up with a result where video call connection may be continued, but with the cost of losing voice connection due to load issues of the user device. The best available cost function may contain only video call application's instant messaging being cost efficient enough for carrying on under the new circumstances the device has entered. Video call application notices the change in the used cost function scheme and prompts to the user a warning that conditions have changed so that also the connection type needs to be changed. The application stays active and responsive all the time when activating instant messaging subroutines and shutting down the video service within the same runtime instance. The perceived user experience is such that the open video call changes to an instant messaging session seamlessly, without stopping the communication application.

In another embodiment a user is consuming a streamed video content with a portable device. The device uses a WLAN connection for making transport connection to an internet server providing the video content. The device may contain a latest H.264 video codec as well as alternate video codecs with lesser hardware requirements. The device uses advanced charging services, which means that it can recognize chargers in its instance vicinity and also actively monitor its internal battery state. The book keeping table inside the device keeps track on and keeps up the table with all these capabilities. It also has an entry containing position information obtained from a satellite position chip like GPS installed on the device.

An advanced optimization algorithm may calculate an optimum from the cost functions and further surface the cost functions having best capabilities for maintaining the consumption of streaming video content. The key parameters that are optimized may be for example parameters affecting to the maintenance of the streaming video capable connection, parameters affecting the battery consumption, listed available video codecs, the geographical position of the device and known services located there, etc.

In the example the device notices it is moving to countryside using a familiar road. The device concludes from the previous route information that it is highly probable that the user is going to the summer house he visited several times last year. The book keeping table contains information of the charging frequencies of the battery in certain geographical positions as well as the density of charging services in those positions. Using that information device draws up a conclusion that the energy is not freely available in the destination location, and hence it changes its behavior to follow a power saving cost function that surfaced in the optimization calculations. According to that, device dims its display brightness remarkably and reduces the power used in the video decoding by starting to use a lighter video codec. The device may also prompt the user to charge the battery as soon as it recognizes the presence of a suitable charger.

Figure 5:
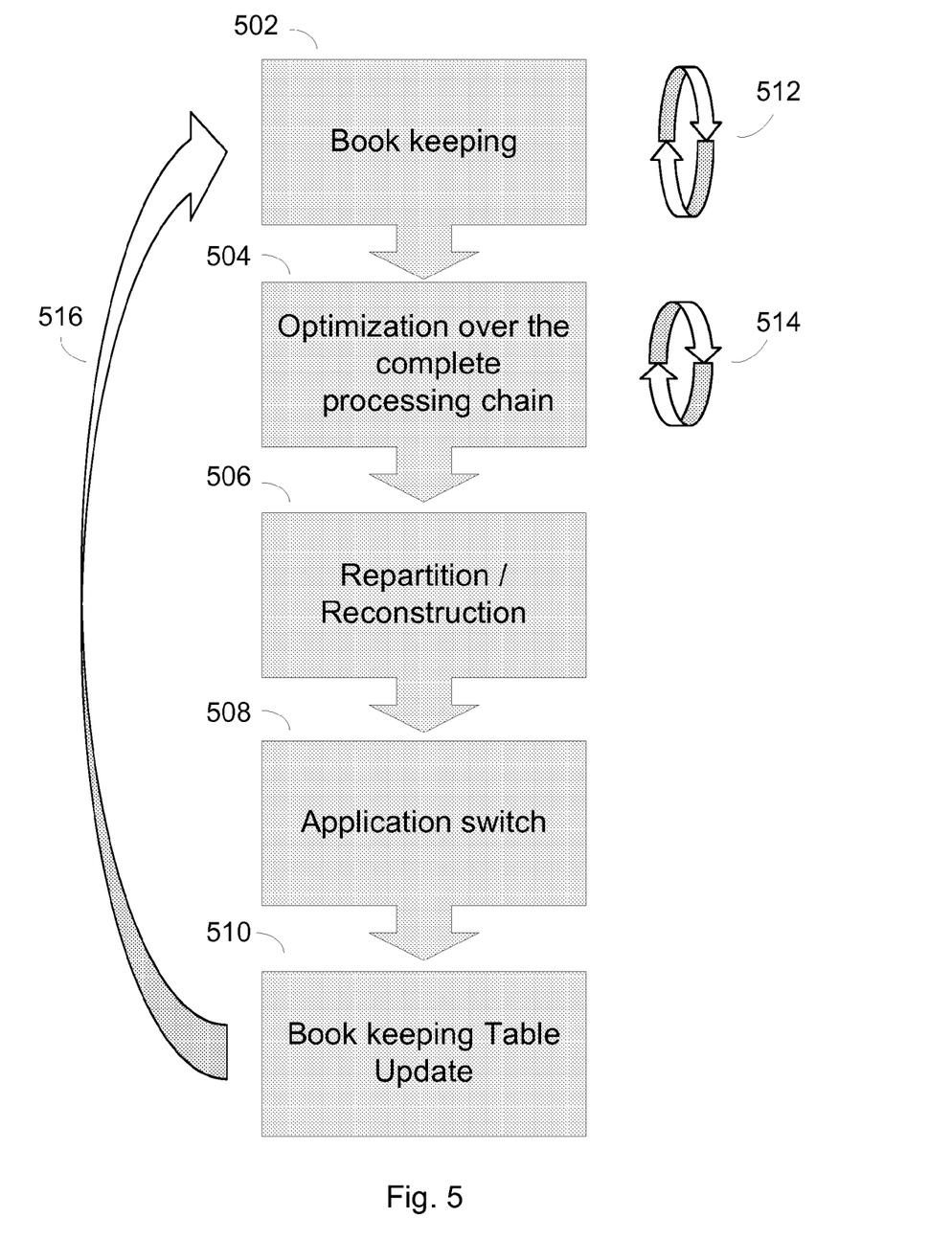
FIG. 5 shows a basic procedure of dynamics according to an embodiment of the invention.

Reference is now made to FIG. 5, which provides a view to a basic procedure of book keeping and optimization that the architecture is performing during its operation. In the book keeping phase the features and properties of the system defined with the design factors used in the architecture in question, are marked up to a data structure called a table. The book keeping phase 502 monitors the alternative possibilities and capacities offered for the use of the device implementing the architecture. The cost calculations for each possibility are stored to the table, and updated in real time when a change to the conditions of the system takes place. The updating of the table happens at 512 independently from other proceedings in the procedure chain. The optimization 504 over the complete processing chain may happen in respect to device in general. The optimization aims to maximize the benefit for the whole device the system is implemented in. This may include some physical limitations the used materials for components of the device may set. The system uses internal measurement data for retrieving the real-time information regarding this and performs optimization based on the measure data on the one hand and on the other hand to policies indicating the limitations of the construction. The optimization is a continuous process, 514, and happens all the time the system is active and reflects to the real-time situation the system encounters at each point of time.

The optimization 504 may also be carried out from the communication point of view. The optimization may search the best possible communication method available for the device implementing the system. As the host device may have several communication interfaces active simultaneously, the optimization process tracks on the properties of the connections and calculates the optimum for each parameter.

It is also possible that the user preferences dictate which properties of the system are used and when: The user preferences may not be the most optimal way to carry out the task in some set ups, but if the user has indicated the desired set of functions of the system in a particular situation, the system follows that path.

Although the system can act independently without user guidance, there may be situations where the capability to show messages on user interface level is valuable. There may be coupled an editing interface to the system, where user can make selections which property combinations are taken to use. The user interface may give to user a final decision power whether the change is acceptable or not. When user input is desired before the system setup changes, there may also be visual/audio indication in the participating devices forming the system before the change of the system configuration takes place so that user can be sure the right devices are taken in.

Another possible optimization aspect may be power optimization, meaning that the system keeps on calculations which ways of carrying out a task are most favorable to the lifetime of the system. It is evident that the optimization parameters are not limited to the presented ones, but there are in fact several other aspects which can be used as a basis for optimization calculations in a system like the depicted one.

In the reconstruction phase 506 the chain for producing application facility is partitioned and reconstructed to follow the newly optimized set of software components. When the reconstruction is established, switching of the application may take place 508. The switch is dynamic and may be sensitive regarding the user experience in such a way that it does not set any extra trouble to the user. The switching phase is also the last possible state where the change to the new environment can still be cancelled. After the processing environment has been switched to another, the book keeping table is updated at 510 to correspond with the new situation. The process returns to its beginning in 516, where the book keeping is carried out. It is noteworthy that the book keeping does not have to be an active process; it can happen as well by sharing previously collected data with new entity entering the proximity space.

In another embodiment user is coming home from a concert in the evening and he has bought the band's latest album from the concert staff at the gates of the concert hall. The album is in digital format, and the user is able to download it from the source media to his personal portable device and start listening to it right away. When user finally wanders to his stairway and to right floor, the portable device is recognized by the environment in his apartment. The environment consist of among the other things, the home audio equipment of the user.

The cost function calculations carried out from the environment point of view reveals that user may experience best possible music consuming experience if the play is transferred to the home equipment of the user. The home audio equipment is ready to receive the content and about to start playing music. The system has, however a policy from the user that the transfer of playing music content is not executed if the time is between 10 pm and 8 am. All involved devices learn this rule and current time, and the transfer is ceased. User listens to the record till its last song with his personal device, and falls asleep happily.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment.

As an example, in the terminal, the processing of the data may happen in ASIC circuitry. It is possible as well that the processing takes place in the CPU of the terminal device. Further, the terminal device may have arrangement to use haptic input/output device. Yet further, a network device may comprise circuitry and electronics for handling, receiving and transmitting data, computer program code in a memory, and a processor that, when running the computer program code, causes the network device to carry out the features of an embodiment. The processing entity in the network device may be a ASIC circuitry of the network device or a generic CPU circuitry or some other appropriate circuitry. Still further, both a terminal device and a network device may both comprise circuitry and electronics for handling, receiving and transmitting data, computer program code in a memory, and a processor that, when running the computer program code, causes both network and terminal devices to carry out a sets of the features of an embodiment.

There may also be several peer devices forming the system all of them comprising circuitry and electronics for handling, receiving and transmitting data, computer program code in a memory, and a processor that, when running the computer program code, executing the embodiments of the invention. It is also possible that only some of the devices forming the system have powerful enough circuitry and electronics to perform required functionality, but other devices with lesser computing capabilities are in such cases submitted under these master devices and will provide their resources to the system only as sources.

As another example, a computer program product is provided that is stored on a computer readable medium and executable in a data processing device. The computer program product includes a computer program code section for obtaining information about resources of one or more peripheral components from at least one peripheral component. The computer program product also includes a computer program code section for forming a policy basing at least partly on the information about the resources of the at least one peripheral component. Additionally, the computer program product includes a computer program code section for forming a cost function basing at least partly on the information about the resources of the at least one peripheral component. Further, the computer program product includes a computer program code section for determining an entry combination of the resources forming the cost function such that the entry combination is at least in part compliant with the policy. Finally, the computer program product includes a computer program code section for changing configuration of the apparatus to at least partly comply with the selected entry combination.

The computer program product may also include a computer program code section for storing said information into a memory being in functional connection with the apparatus and a computer program code section for linking information in the memory regarding to a property it belongs to. Further, the computer program product may also include a computer program code section for forming one or more cost functions by using the collected information within a property with respect to resource variables within said property and a computer program code section for arranging at least partly an optimization of said cost functions regarding to selected property.

It is obvious that the present invention is not limited solely to the above-presented embodiments, but it can be modified within the scope of the appended claims.

The invention claimed is:

1. A method for processing information in an apparatus having one or more interfaces to one or more peripheral components, said method comprising:
   obtaining information about resources of the one or more peripheral components from at least one peripheral component;
   forming a policy based at least partly on the information about the resources of the at least one peripheral component;
   forming a cost function based at least partly on the information about the resources of the at least one peripheral component, wherein the cost function is configured to measure a tradeoff between gain provided by use of the at least one peripheral component and a corresponding cost to system functionality as a result of the use of the at least one peripheral component;
   determining, with a processor of the apparatus, an entry combination of the resources four ing the cost function such that the entry combination is at least in part compliant with the policy; and
   changing configuration of the apparatus to at least partly comply with the determined entry combination.

2. A method according to claim 1, further comprising:
   storing said information into a memory being in functional connection with the apparatus; and
   linking information in the memory regarding to a property it belongs to.

3. A method according to claim 1, where boundaries of acceptable values of resource variables retrieved via said interfaces are derived from the formed policy.

4. A method according to claim 1, further comprising:
   forming one or more cost functions by using the collected information within a property with respect to resource variables within said property; and
   arranging at least partly an optimization of said cost functions regarding to selected property.

5. A method according to claim 1, further comprising:
   identifying a minimum of the cost function; and
   checking that said minimum of the cost function provides for an improved outcome relative to the cost function currently used.

6. A method according to claim 5, further comprising:
   providing the properties of the found cost function minimum to the apparatus for approval; and
   updating the information in the memory to follow the changed properties.

7. A method according to claim 1, where one or more formed cost functions are adaptive resource tables.

8. A method according to claim 1, where the peripheral component is at least one of the following: user interface, haptic feedback circuit, acceleration sensor, optical sensor, position sensor or radio antenna.

9. An apparatus having one or more interfaces to one or more peripheral components, the apparatus comprising a processor, and memory including computer program code, the memory and the computer program code configured to, with the processor, cause the apparatus to perform at least the following:
   obtain information about resources of the one or more peripheral components from at least one peripheral component;
   form a policy based at least partly on the information about the resources of the at least one peripheral component;
   form a cost function based at least partly on the information about the resources of the at least one peripheral component, wherein the cost function is configured to measure a tradeoff between gain provided by use of the at least one peripheral component and a corresponding cost to system functionality as a result of the use of the at least one peripheral component;
   determine, with the processor executing computer program code stored by the memory, an entry combination of the resources forming the cost function such that the entry combination is at least in part compliant with the policy; and
   change configuration of the apparatus to at least partly comply with the determined entry combination.

10. An apparatus according to claim 9, where processing of said information is done on an application specific integrated circuit (ASIC) circuit.

11. An apparatus according to claim 9, where processing of said information is done on central processing unit circuit.

12. An apparatus according to claim 9, further comprising computer program code configured to, with the processor, cause the apparatus to perform at least the following:
    store said information into a memory being in functional connection with the apparatus; and
    link information in the memory regarding to a property it belongs to.

13. An apparatus according to claim 9, further comprising computer program code configured to, with the processor, cause the apparatus to perform at least the following:
    form one or more cost functions by using the collected information within a property with respect to resource variables within said property; and
    arrange at least partly an optimization of said cost functions regarding to selected property.

14. An apparatus according to claim 9, further comprising computer program code configured to, with the processor, cause the apparatus to perform at least the following:
    identify a minimum of the cost function; and
    check that said minimum of the cost function provides for an improved outcome relative to the cost function currently used.

15. An apparatus according to claim 14, further comprising computer program code configured to, with the processor, cause the apparatus to perform at least the following:
    provide the properties of the found cost function minimum to the apparatus for approval; and
    update the information in the memory to follow the changed properties.

16. An apparatus according to claim 9, where the peripheral component is at least one of the following: user interface, haptic feedback circuit, acceleration sensor, optical sensor, position sensor or radio antenna.

17. An apparatus comprising:
    means for obtaining information, with a processor of the apparatus, about resources of one or more peripheral components from at least one peripheral component;
    means for forming a policy, with the processor of the apparatus, based at least partly on the information about the resources of the at least one peripheral component;
    means for forming a cost function, with the processor of the apparatus, based at least partly on the information about the resources of the at least one peripheral component, wherein the cost function is configured to measure a tradeoff between gain provided by use of the at least one peripheral component and a corresponding cost to system functionality as a result of the use of the at least one peripheral component;
    means for determining, with the processor of the apparatus, an entry combination of the resources forming the cost function such that the entry combination is at least in part compliant with the policy; and means for changing configuration of the apparatus, with the processor of the apparatus, to at least partly comply with the determined entry combination.

18. A computer program product stored on a non-transitory computer readable medium and executable in a data processing device, wherein the computer program product comprises:

a computer program code section configured to obtain information about resources of one or more peripheral components from at least one peripheral component;

a computer program code section configured to form a policy based at least partly on the information about the resources of the at least one peripheral component;

a computer program code section configured to form a cost function based at least partly on the information about the resources of the at least one peripheral component, wherein the cost function is configured to measure a tradeoff between gain provided by use of the at least one peripheral component and a corresponding cost to system functionality as a result of the use of the at least one peripheral component;

a computer program code section configured to determine an entry combination of the resources forming the cost function such that the entry combination is at least in part compliant with the policy; and a computer program code section configured to change configuration of the apparatus to at least partly comply with the selected entry combination.

19. A computer program product according to claim 18, wherein the computer program product comprises further:

a computer program code section configured to store said information into a memory being in functional connection with the apparatus; and a computer program code section configured to link information in the memory regarding to a property it belongs to.

20. A computer program product according to claim 18, wherein the computer program product comprises further:

a computer program code section configured to form one or more cost functions by using the collected information within a property with respect to resource variables within said property; and a computer program code section configured to arrange at least partly an optimization of said cost functions regarding to selected property.

* * * * *